United States Patent [19]

Orain

[11] Patent Number: 4,580,995
[45] Date of Patent: Apr. 8, 1986

[54] TELESCOPIC HOMOKINETIC JOINT

[75] Inventor: Michel A. Orain, Conflans Sainte Honorine, France

[73] Assignee: Glaenzer Spicer, Poissy, France

[21] Appl. No.: 630,688

[22] Filed: Jul. 13, 1984

Related U.S. Application Data

[62] Division of Ser. No. 379,474, May 18, 1982, Pat. No. 4,490,126.

[30] Foreign Application Priority Data

Jun. 1, 1981 [FR] France ................................. 81 10796

[51] Int. Cl.[4] .............................................. F16D 3/20
[52] U.S. Cl. .................................. 464/111; 464/120; 464/905
[58] Field of Search ............... 464/111, 120, 122, 123, 464/124, 162, 167, 168, 169, 905

[56] References Cited

U.S. PATENT DOCUMENTS

| 1,232,829 | 7/1917 | Moore | 464/124 |
| 2,532,754 | 12/1950 | Beck, Sr. | 464/167 |
| 2,983,120 | 5/1961 | White | 464/168 |
| 3,381,497 | 5/1968 | Allen | 464/122 |
| 3,490,251 | 1/1970 | Roethlisberger | 464/124 |
| 3,596,478 | 8/1971 | Komuzin | 464/111 |
| 3,877,251 | 4/1975 | Wahlmark | 464/111 |
| 4,091,641 | 5/1978 | Welschof | 464/111 |
| 4,490,126 | 12/1984 | Orain | 464/111 |

FOREIGN PATENT DOCUMENTS

| A057104 | 12/1952 | France | 464/168 |
| 1067046 | 6/1954 | France | 464/168 |
| 1341628 | 9/1963 | France | 464/111 |
| 861088 | 2/1961 | United Kingdom | 464/168 |

Primary Examiner—Stuart S. Levy
Assistant Examiner—Daniel P. Stodola
Attorney, Agent, or Firm—Banner, Birch, McKie & Beckett

[57] ABSTRACT

A telescopic homokinetic joint which is capable of filtering vibrations coming from the driving means and is also devoid, or substantially devoid, of periodical internal friction. This result is obtained in a homokinetic joint comprising a first element including three pairs of planes which are evenly angularly spaced apart about a first axis, the planes of each pair being parallel to each other and to said axis, a second element defining three spherical bearing surfaces which are evenly angularly spaced apart about a second axis, and intermediate elements. The intermediate elements comprise planar surfaces which are respectively parallel to the planes and spherical surfaces which cooperate with the spherical bearing surfaces. According to the invention, rolling elements are interposed between the planar surfaces of the intermediate elements and the planes of the first element.

13 Claims, 12 Drawing Figures

TELESCOPIC HOMOKINETIC JOINT

This application is a division of application Ser. No. 379,474, filed May 18, 1982, now U.S. Pat. No. 4,490,126.

DESCRIPTION

The present invention relates to telescopic or sliding homokinetic joints employed in particular in automobile vehicle transmissions and especially in front wheel drive vehicles between a power take-off shaft of the drive unit and a driving wheel.

It is known that combustion engines are the centre of vibrations of amplitudes which vary in a wide frequency range of the order of 30 to 300 Hertz. A sliding homokinetic joint should not only transmit the torque at variable angles and elongations but also be infinitely pervious axially both in respect of a zero angle and in respect of a maximum angle of operation, so as to prevent the axial components of the vibrations of the engine from travelling toward the driving wheel and the structure of the vehicle. Further, when it operates at an angle, the joint should not itself introduce a periodical axial excitation capable of initiating vibrations in the structure of the vehicle.

Now, owing to operating friction whose amplitude varies cyclically, known sliding homokinetic joints have the following drawbacks:

The moments perpendicular to the axis of rotation, produced by friction, vary periodically and create corresponding excitations which may result in resonances in the structure of the vehicle or in the transmission shaft itself.

These periodic variations related to friction result from the manner in which the rolling members move, these members rolling or sliding under high load in accordance with the considered phase angle, thus producing very high fluctuations in the resulting moment. Such an operation in which the same rolling member (such as a ball) changes from a practically pure rolling to a total sliding, is completely different from that of the ball bearing in which the sliding rate is low and practically constant.

There has moreover been described in French Pat. No. 1 341 628 filed on Sept. 18, 1962 in the name of GLAENZER SPICER a homokinetic joint comprising a first element defining three pairs of planes which are evenly angularly spaced apart about a first axis, the plane of each pair being parallel therebetween and to said first axis, a second element defining three spherical bearing surfaces evenly angularly spaced apart about a second axis, and intermediate elements comprising, on one hand, planar surfaces respectively parallel to said planes and, on the other hand, spherical surfaces which cooperate with said spherical bearing surfaces.

However, such a joint cannot be used in practice owing to the periodical disturbances produced thereby. Thus, under the transmission of torque, the frictional forces vary as a function of the angle of rotation; this variation may be represented by a stepped curve having three cycles per revolution. The break moment due to these frictions consequently vary in accordance with a sawtooth curve having six cycles per revolution. The magnitude of these variations renders them quite unacceptable, in particular in the application envisaged hereinbefore.

An object of the invention is consequently to provide a telescopic homokinetic joint which is capable of filtering the vibrations coming from the driving means and which is also devoid, or substantially devoid, of periodical internal friction met with in the prior art. Such a joint must, on the contrary, have a friction moment which is constant in magnitude and in direction and permit a very free sliding irrespective of the angle at which it operates and must not produce periodical axial stresses.

This is achieved in a homokinetic joint of the type comprising a first element including three pairs of planes which are evenly angularly spaced apart about a first axis, the planes of each pair being parallel to one another and to said first axis, a second element defining three spherical bearing surfaces which are evenly angularly spaced apart about a second axis, and intermediate elements comprising, on one hand, planar surfaces respectively parallel to said planes and, on the other hand, spherical surfaces which cooperate with said spherical bearing surfaces, wherein rolling elements are interposed between the planar surfaces of the intermediate elements and the planes of the first element, said rolling elements being disposed in three sub-assemblies each comprising two rows of rolling elements retained by cages.

According to other features:

the rows of rolling elements extend on a length exceeding the length of the gap between the planar surfaces between which they are disposed;

each cage comprises two opposed sides each carrying a row of rolling elements, said two sides being interconnected at their ends by end connection or bridge regions;

the cages have a generally rectangular shape;

the rolling elements are needles;

elastically yieldable means are provided between each cage and the element comprising the pairs of planes for biasing each cage to a mean position;

said elastically yieldable means comprise at least one spider member having three branches with the ends of the branches engaged on the bridges of the cages, and at least one spring interposed between said spider member and the element defining the rolling planes;

the pairs of rolling planes are defined by wings which extend radially outwardly from a centre shaft and the concave spherical surfaces are defined in an outer element, the intermediate elements having a planar-convex shape;

the pairs of rolling planes are defined on an outer element in the shape of a tulip and the convex spherical bearing surfaces are defined by a centre element in the shape of a tripod, the intermediate elements having a planar-concave shape;

the pairs of rolling planes are defined by wings which extend radially inwardly from an outer element and the concave spherical bearing surfaces are defined by a centre element, the intermediate elements having a planar-convex shape.

The invention will be described in more detail hereinafter with reference to the accompanying drawings which are given solely by way of example and in which.

Figure 1:
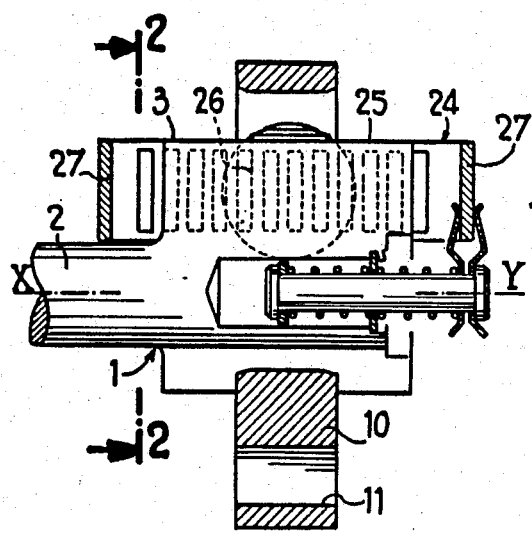
FIG. 1 is a longitudinal sectional view of a joint according to the invention.
Figure 2:
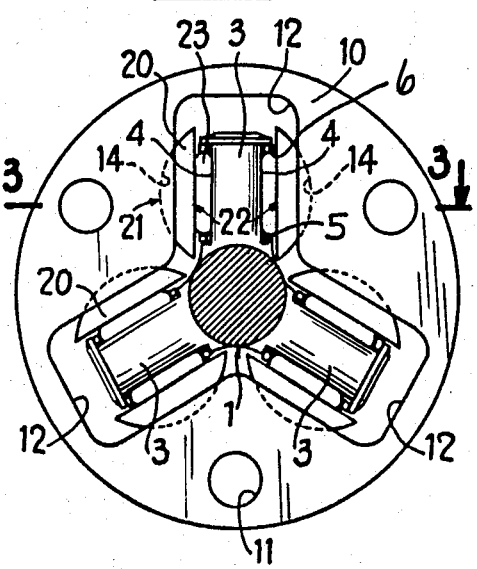
FIG. 2 is a sectional view taken on line 2—2 of FIG. 1.
Figure 3:
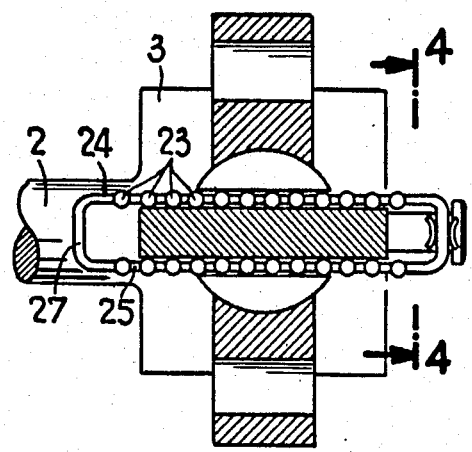
FIG. 3 is a sectional view taken on line 3—3 of FIG. 2.
Figure 4:
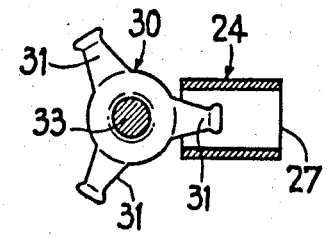
FIG. 4 is a sectional view taken on line 4—4 of FIG. 3.

The joint shown in FIGS. 1 to 3 comprises a first element or "tri-planar" element 1 including a shaft section 2 which has an axis X—X and from which extend three radial wings 3 whose median planes are evenly spaced 120° apart about the axis X—X. This tri-planar element defines consequently three pairs of planes, the plane 4 of each pair being parallel to each other and to the axis X—X.

A second element having an axis Y—Y is constituted by a barrel 10 which may be connected, for example to driving means, by bolts fixed in apertures 11. This barrel comprises three openings 12 whose median planes are also disposed at 120° to each other above the axis Y—Y, which, in the position illustrated in the drawings, is in alignment with the axis X—X. Concave spherical cavities 14 are defined in the confronting sides of the openings 12.

Figure 5:
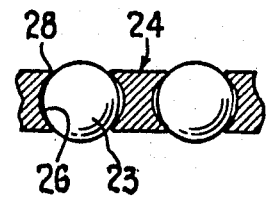
FIG. 5 is a detail view of the mounting of the needles in a cage.

Six intermediate elements 20 of planar-convex shape are interposed between the tri-planar element and the barrel. Their spherical surfaces 21 are received in the spherical cavities 14 of the barrel and their planar surfaces 22 are disposed to be parallel to and at a distance from the planar surfaces 4 of the tri-planar element. Needles 23 are disposed between the confronting planar surfaces 4 and 22. Provided for each pair of planes are two parallel rows of needles which are maintained in a cage 24 comprising two large side portions 25 which define cavities 26 in which the needles are disposed, the large side portions 25 being interconnected at their ends by two bridges 27. These cages have consequently a generally rectangular shape. The cavities 26 are provided with nose portions 28 for retaining the needles when they are located outside the gap between the planar surfaces 4, 22 (FIG. 5). The cages are radially maintained in position relative to the tri-planar element between shoulders 5 and 6.

The wings 3 of the tri-planar element have an axial length which exceeds the diameter of the planar-convex elements 20 and the cages 24 have a length exceeding the length of said wings.

Means are provided for returning the cages of the needles to a median position. These means comprise two spider members 30 having three branches 31 and made from hardened pressed sheet metal. A bridge of each of the cages is retained between two confronting branches of the two spider members. The latter are gripped between a head 32 of a rod 33 and a spring 34 mounted on the latter. The rod 33 is slidably mounted in a recess 7 formed in the element 1 and in a ring 8 fixed to the latter. This ring acts as a support for the spring 34 and for a second spring 35 whose other end bears against an enlarged end portion 36 of the rod 33.

The operation and the advantages of such a joint are as follows. When transmitting a torque at an angle, the planar-convex elements 20 oscillate and rotate as they are slidably supported in the concave spherical cavities 14 formed in the sides of the openings of the barrel. At the same time, the needles 23 roll along the confronting surfaces 4 and 22 of the wings 3 and the elements 20.

Note that the clearance between these intermediate elements 20, the needles 23 and the rolling planes 4 may be completely eliminated. There may even be provided a slight pre-stressing without adversely affecting the smoothness of operation and without creating any hard point in the axial sliding. This joint may consequently operate with no angular play, which constitutes an important quality.

The loading of the needles 23 and their unloading, depending on whether they enter the regions located between the intermediate elements 20 and the wings 3 of the tri-planar element or whether they leave these regions, occur progressively and smoothly, even under high torque, for two reasons:

First, the spherical domes 20 are more flexible on the edges while remaining sufficiently strong. Second, the start of the loading occurs only on the median part of the needle.

Upon a sliding of the joint, the needles always roll in a direction parallel to the axis X—X of the shaft 2. During this time, the planar-convex elements oscillate relative to their cavities defined in the barrel. The sliding of these spherical surfaces during the rotation at an angle and under torque produces a resulting moment of constant value and fixed direction, which corresponds to the desired result.

When the joint operates at an angle, the alternating movement of translation of the planar-convex elements relative to the planes of the wings occurs in a pure rolling motion without resistance. This alternating movement therefore does not result in any fluctuation of the sliding moment and creates no periodical axial stress on the shaft.

Apart from the very free axial sliding at zero angle or at a large angle of operation, which completely filters the axial vibrations, the features of the joint according to the invention also result in a perfect neutrality which is essential to the comfort of automobile vehicles.

Figure 6:
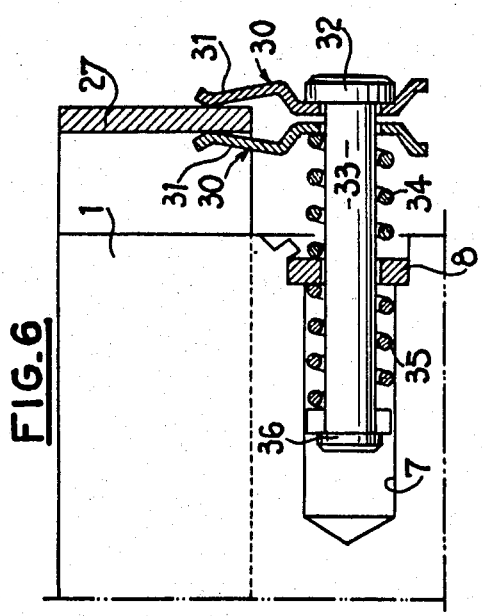
FIGS. 6 and 7 are partial sectional views of the manner of operation of elastically yieldable return means for the cages.
Figure 7:
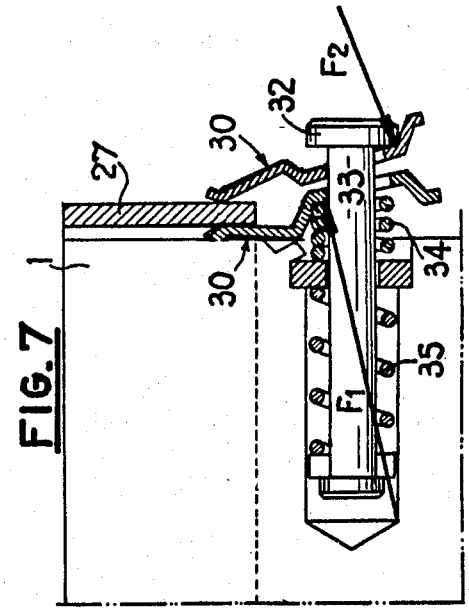

The return device, shown in more detail in FIGS. 6 and 7, performs an important function. Indeed, it permits:

1. The translation of all of the three cages toward the right or the left, corresponding to the sliding of the joint respectively in compression on in extension.

2. The alternating differential translation of the three cages with displacements corresponding to one half of the displacement of the planar convex elements relative to the corresponding planes of the element 1, owing to the rotation of the joint at an angle.

In this case, the two spider members 30 assume an inclination which roughly corresponds to one half of the relative inclination between the axes X—X and Y—Y.

The springs 34, 35 bias the spider members 30 to a mean position perpendicular to the axis of the rod 33. FIG. 7 represents an extreme position in which the spring 34 is compressed while the spring 35 is extended. There results an axial force which tends to move the two spider members toward the right and therefore to recentre the cage, the force designated by the arrow $F^1$ being larger than the force designated by the arrow $F^2$.

Further, these two forces create a return moment which biases the planes of the two spider members to a position perpendicular to the axis of the rod 33 and consequently to equalize the relative axial positions of the bridges and of the three cages.

Figure 8:
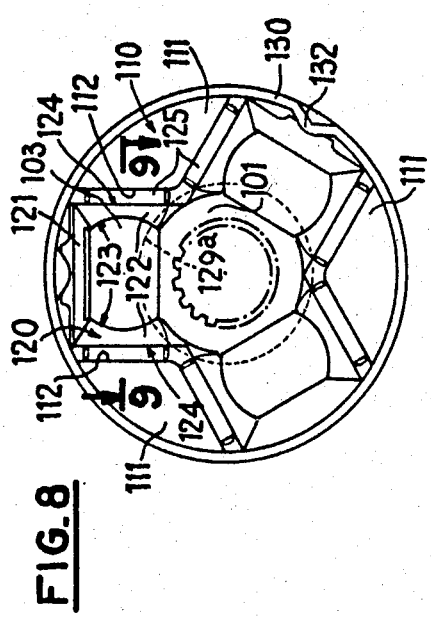
FIG. 8 is a cross-sectional view of a modification.
Figure 9:
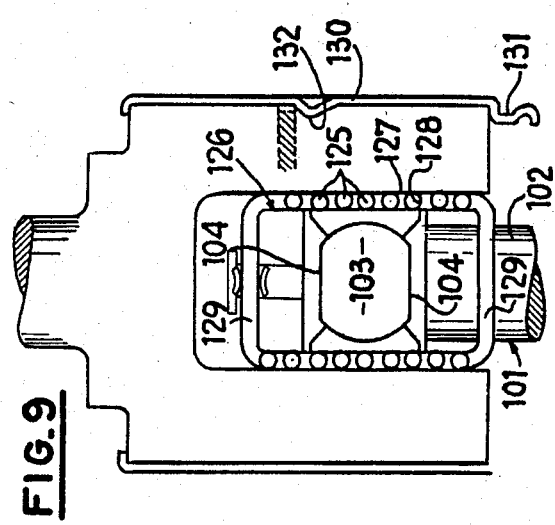
FIG. 9 is a sectional view taken on line 9—9 of FIG. 8.

FIGS. 8 and 9 show another arrangement of a slidable homokinetic joint according to the invention. This joint comprises a first element 101 constituting a tripod element rigid with a shaft 102. This tripod element carries three spherical balls 103 which are spaced 120° apart about the axis of the tripod element. These spherical balls 103 are truncated on flat surfaces 104 which are disposed perpendicular to the axis of the tripod element so as to permit the mounting of the intermediate elements which will be described hereinafter.

A second element is formed by a tulip element 110 comprising three branches or petal portions 111 which define therebetween runaways constituted by pairs of planes 112, the planes of each pair being parallel to each other and parallel to the axis of the tulip element.

Disposed between the spherical balls 103 and the parallel planes 112 are intermediate elements 120 which are formed, in the illustrated embodiment, by U-structures comprising an end wall 121 and lateral walls 122 which define, on one hand, a concave spherical inner surface 123 cooperating with the ball 103 and, on the other hand, planar outer surfaces 124 which are parallel to the surfaces 112 constituting the runways. Rows of needles 125, retained as in the preceding embodiment by cages 126, are disposed between the confronting planar surfaces of the tulip element 110 and the intermediate elements 120.

These cages have a rectangular shape and include large side portions 127 defining cavities 128 in which the needles are received, said longitudinal large sides being interconnected by transverse side portions or bridges 129. The bridges are cut out internally in the shape of an arc of a circle (at 129a) so as to allow the angular movement of the shaft 102.

The tulip element is surrounded by a cover 130 constituted by a metal formed-over sleeve defining a groove 131 in which a sealing bellows (not shown) can be fixed. This cover has three inwardly projecting portions 132 located on the axis of the openings of the tulip element. These projecting portions act as an abutment for the bridges 129 of each of the cages at the end of the extension travel of the joint.

Elastically yieldable return means for the cages are also provided as diagrammatically shown on FIG. 9. The return means may be such as those described and illustrated in respect of the first embodiment.

Figure 10:
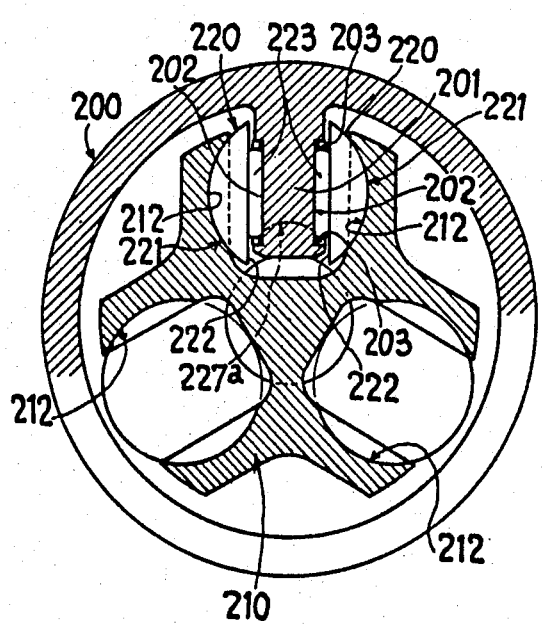
FIG. 10 is a cross-sectional view of another modification.
Figure 11:
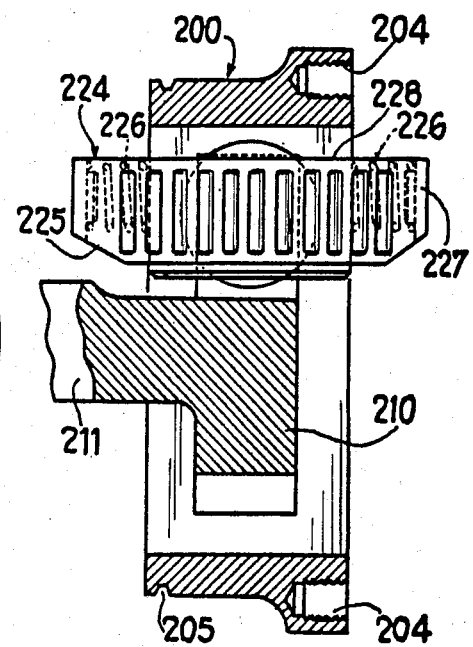
FIG. 11 is a sectional view taken on line 11—11 of FIG. 10.

A third modification is shown in FIGS. 10 and 11. The joint comprises a first element or barrel 200 which is roughly cylindrical and from which extend radially inwardly three wings 201 spaced 120° apart about the axis of the element 200. These three wings each define two rolling planes 202 limited by two radial shoulders 203. This barrel may comprise fixing aperatures 204 and a circular groove 205 for receiving the end portion of a sealing bellows (not shown).

The joint comprises a second element 210 which is rigid with a shaft 211 and defines three concave spherical cavities 212 which are spaced 120° apart relative to the axis of the shaft 211.

Disposed between the two elements 200, 210 are intermediate elements 220 constituted by planar-convex spherical domes, the spherical parts 221 of which are received in the cavities 212 of the centre element 210 whereas the planar surfaces 222 are parallel to the planes of the outer element 200. Disposed, as in the foregoing embodiments, between the confronting planar surfaces are rows of needles 223 which are retained in cages 224. These cages have at their inner ends inclined surfaces 225 to permit the relative inclination of the shafts.

Further, return springs 226 are disposed between the end bridges 227, interconnecting two longitudinal side portions 228 of the cages, and the adjacent surfaces of the arms or wings 201 defining the rolling planes 202. These bridges are also cut away at 227a.

In this arrangement, the runways are preferably formed by a broaching operation in the same way as the guiding edges 203 for the cages.

The operation and the advantages are the same as those mentioned in respect of the first embodiment.

Figure 12:
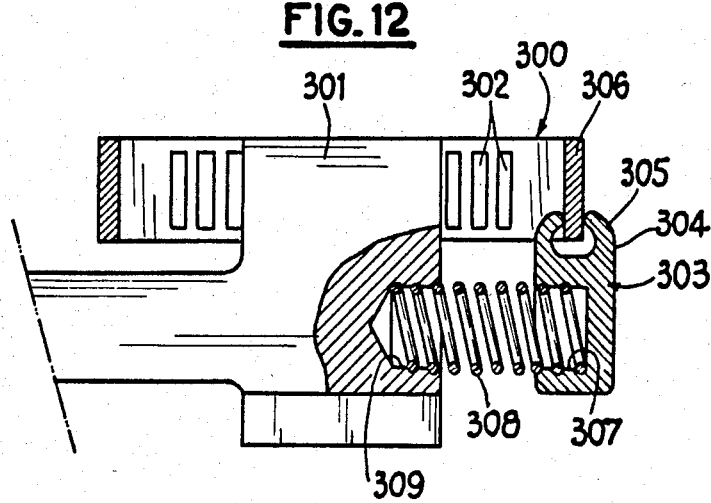
FIG. 12 is a partial view of other elastically yieldable return means.

FIG. 12 shows a particularly simple modification of the elastically yieldable means for returning the cages 300 relative to the element 301 defining the rolling pins with which the needles 302 carried by this cage cooperate. These means comprise a member 303 moulded from a plastic material, eg. nylon, defining three branches 304 disposed at 120° to each other. Each branch terminates in a clip or holder 305 or other suitable means which engages on a bridge 306 of a cage. The centre portion of the member 303 defines a cavity 307 in which is fixed, for example, screwed, a coil spring 308 whose other end portion is also fixed in a cavity 309 in the element 301. Such return means may of course be employed in the various embodiments of the joint described hereinbefore.

Having now described my invention what we claim as new and desire to secure by Letters Patent is:

1. A homokinetic joint comprising:
   a first element having a first axis and including three portions which extend radially with respect to said first axis spaced 120° apart about said first axis, each of said portions defining spherical bearing surfaces;
   a second element having a second axis and defining three raceways which are spaced 120° apart about said second axis, each said raceway being constituted by a pair of planar surfaces parallel to each other and parallel to said second axis, said surfaces defining therebetween a gap, each of said portions of the first element being located in the gap defined between the planar surfaces of a respective raceway with said spherical bearing surfaces facing said planar surfaces;
   intermediate elements disposed between said spherical bearing surfaces and said planar surfaces, said intermediate elements having planar surfaces disposed parallel to and facing the planar surfaces of said raceways and having spherical bearing surfaces complementary and fitting with the spherical bearing surfaces of said first element; and
   rolling elements disposed between said planar surfaces of said raceways and said planar surfaces of said intermediate elements, said rolling elements being arranged in a linear manner to form three sub-assemblies, each said sub-assembly including means for allowing both relative linear and angular displacements of said first and second elements, said allowing means including two linear rows of said rolling elements and cage means retaining the rows of rolling elements, each said row of rolling elements having a length exceeding the length of the planar surfaces of said intermediate elements.

2. A joint according to claim 1, wherein each cage means comprises two opposed side portions and two bridges interconnecting the two side portions, each side portion retaining a row of said rolling elements.

3. A joint according to claim 2, wherein each cage means has a generally rectangular shape.

4. A joint according to claim 1, wherein the intermediate elements are constituted by U-structures each comprising two sets of respectively planar and concave spherical surfaces.

5. A joint according to claim 1, wherein the rolling elements are needles.

6. A joint according to claim 1, wherein said first element is a center element in the form of a tripod and said second element is an exterior element in the shape of a tulip.

7. A joint according to claim 1, wherein the cage means are so shaped in the vicinity of the ends thereof so as to permit angular movement of an adjacent shaft.

8. A joint according to claim 1, comprising abutment means for the cage means at the end of an extension travel of the first and second elements of the joint.

9. A joint according to claim 1, wherein the spherical bearing surfaces of said first element are convex and the intermediate elements have planar-concave shape.

10. A joint according to claim 9, wherein the intermediate elements are constituted by six planar-concave spherical domes.

11. A joint according to claim 1, wherein return means are provided between each sub-assembly and one of said first and second elements for elastically returning each sub-assembly to a mean position relative to said one of said first and second elements.

12. A joint according to claim 11, wherein each cage means comprises two opposed side portions and two bridges interconnecting the two side portions, each side portion retaining a row of said rolling elements, and said return means comprises at least a spider member having three branches, end portions of the branches being engaged on the bridges of the respective cage means, and at least a spring interposed between said spider member and the first element.

13. A joint according to claim 11, wherein said return means comprise at least a return spring between each cage and an end surface of said first element.

* * * * *